United States Patent [19] [11] 4,180,170
Meinken [45] Dec. 25, 1979

[54] ROTARY TOWER CRANE FOR CONSTRUCTION PURPOSES WITH A DISTRIBUTOR DEVICE FOR CONCRETE

[75] Inventor: Bernhard Meinken, Haltern, Fed. Rep. of Germany

[73] Assignee: Freiedrich Wilhem, Schwing GmbH, Fed. Rep. of Germany

[21] Appl. No.: 885,388

[22] Filed: Mar. 10, 1978

[30] Foreign Application Priority Data

Mar. 10, 1977 [DE] Fed. Rep. of Germany ....... 2710366

[51] Int. Cl.[2] .......................... B66C 23/00; F16L 3/16

[52] U.S. Cl. ......................................... 212/1; 137/615; 212/58 R; 212/66

[58] Field of Search ................... 212/1, 28, 57, 56, 61, 212/63, 64, 66; 137/615

[56] References Cited

U.S. PATENT DOCUMENTS 3,213,575 10/1965 Boczek ............................. 212/57 X
3,459,222 8/1969 McElroy ............................. 137/615

*Primary Examiner*—Robert G. Sheridan
*Attorney, Agent, or Firm*—Remy J. VanOphem

[57] ABSTRACT

A rotary tower crane for construction purposes comprising a non-rotating mast, a boom mounted at the head of the mast by a rotary connection so as to be swingable about the mast axis, a lifting device on the boom consisting of a hoisting rope which can be raised and lowered, and a distributor device for supplying and distributing concrete in the working area of the crane. The distributor device comprises a platform mounted on the mast below the rotary connection, an articulated distribution arm serving as a carrier structure for a concrete conveyor pipe formed in a plurality of sections connected together by ram-actuated connections, and having a rotatable mounting located on the platform. The platform is mounted on the mast by a ram-actuated rotational coupling so that the platform may be swung about an axis parallel to the axis of the crane mast to provide an operational field for the platform which is limited by the extent of swing of the platform on both sides of the crane mast.

6 Claims, 3 Drawing Figures

ROTARY TOWER CRANE FOR CONSTRUCTION PURPOSES WITH A DISTRIBUTOR DEVICE FOR CONCRETE

The invention relates to a rotary tower crane for construction purposes having a boom which can be swung around the axis of the crane mast, a lifting device consisting of a hoisting rope which can be raised and lowered, and a distributor device for concrete for supplying and distributing concrete in the working area of the crane with the aid of at least one concrete conveyor pipe arranged on a carrier structure, the boom rotatable at the head of the mast and under which rotary connection on the non-rotatable mast a platform is arranged which serves for the accommodation of the distributor device for the concrete, which device comprises a distribution arm serving as a carrier structure for the concrete conveyor pipe and which, in a manner known per se, is divided into a plurality of sections connected together by power actuated couplings and features its own rotating mechanism which is located on the platform.

A rotary tower crane of this kind further develops known rotary tower cranes with a distributor device for concrete in that the concrete distributor device can be employed independently of the lifting structure which, in turn, can be employed independently of the concrete distributor device, the operational field of the concrete distributor device at least partly coinciding with the operational field of the lifting structure, and, in one embodiment, completely coinciding therewith.

The object of the invention lies in further developing this basic idea so as to achieve an extensive to complete coverage of the operational fields of the lifting structure and concrete distributor device with only one distribution arm.

According to the invention this object is achieved in that the platform which can be swung is mounted by a power actuated rotational coupling for swinging movement about an axis parallel to the axis of the crane mast, so as to provide an operational field for the platform which is limited by the extent of swing of the platform on both sides of the crane mast.

By this means, the rotating mechanism of the distribution arm is adjustable along a curve produced by the operational field of the platform, so that the most favourable position of the rotating mechanism for concrete distribution can be selected. Thus, the operational fields of the concrete distributor device, in the limiting positions respectively of the platform, may be arranged to overlap, so that the total operational field of the distribution arm coincides with that of the crane, or even exceeds it.

The advantage of the invention is that this extension of the operational field of the concrete distributor device is achieved with a single distribution arm, so that a considerable simplification results and means for preventing collisions between several distribution arms are not required.

Generally, it has proved adequate to make the platform swingable through approximately 270°. This has also the advantage that the power actuated coupling of the platform can be set with a relatively simple rotational drive, namely a ram, and fixed in the selected position.

With a crane mast having a polygonal cross-section, e.g. with a square crane mast, the rotational axis may be arranged on the extension of a diagonal. By this means it is possible to swing the platform up to the sides of the mast meeting at the relative corner of the cross-section of the mast.

With respect to the relatively large extent of reach of the distribution arm which can be employed within the scope of the invention, it is recommended, according to a further embodiment of the invention, to provide the platform with a support arm which, for its part, can be pivoted around a further rotational coupling whose rotational axis coincides with the rotational axis of the platform rotational coupling. By this means a relief of the load of the platform power actuated coupling can be achieved.

Preferably, the rotational coupling of the support arm is arranged above the power actuated coupling of the platform.

Details, further characteristics and other advantages of the invention can be seen from the following description of an embodiment with reference to the accompanying drawings, in which.

Figure 1:
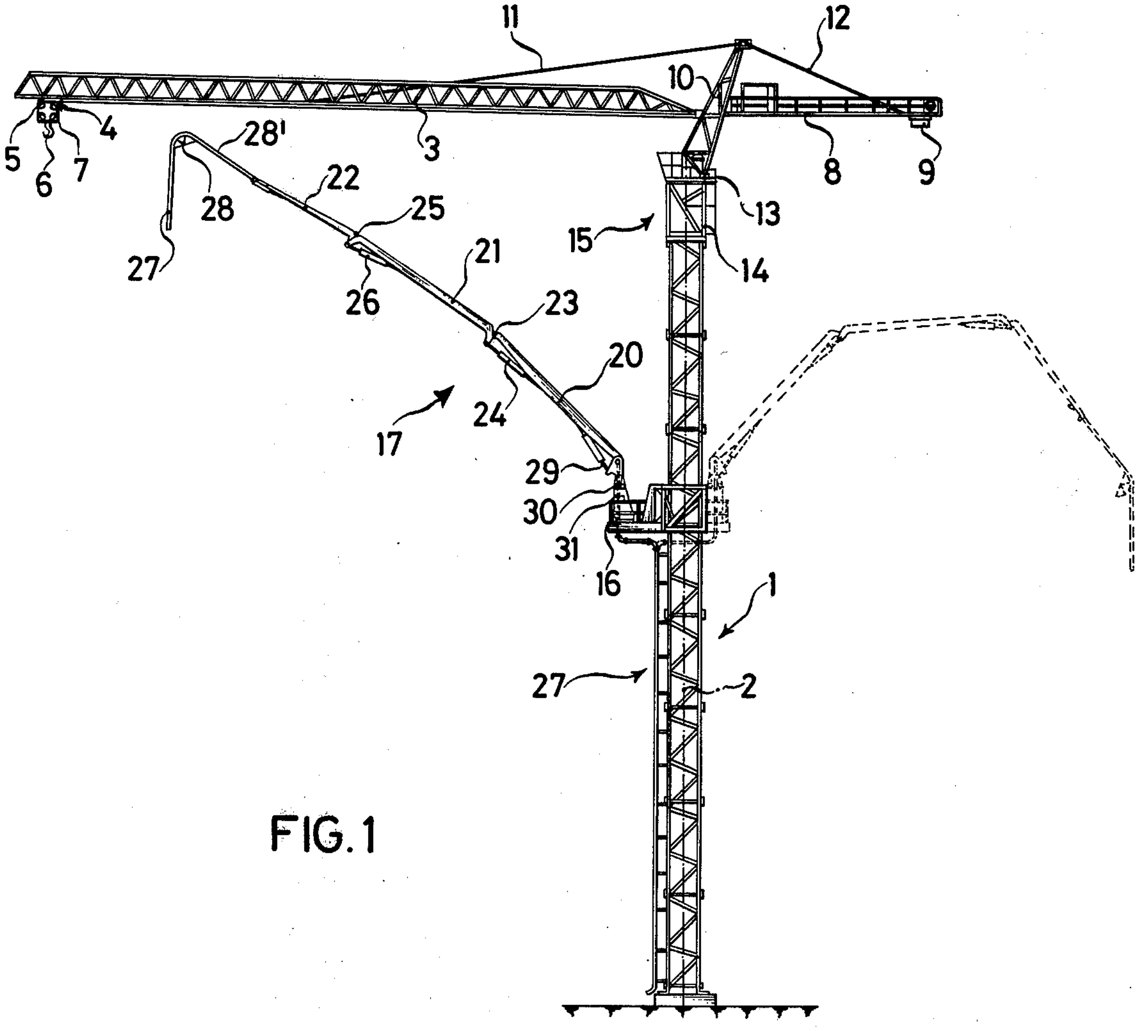
FIG. 1 is a side view of a rotary tower crane according to the invention.

The rotary tower crane shown in FIG. 1 has a non-rotatable crane mast 1, the axis of which is indicated at 2. The horizontal boom 3 of the crane has a travelling pulley 4 for a multi-reeved hoisting rope 5, which serves for raising and lowering a harness 7 carrying the crane hook 6. A counter boom 8 is provided with a counterweight 9. Both booms are supported by tensioned cables 11 and 12 passing over a tower 10. The tower 10 sits on a rotatable part of a rotational coupling generally indicated at 13. The non-rotatable part of the rotational coupling sits on a section of framework 14 which is provided with an hydraulic climbing device which is known per se but which is not, however, shown in detail. The climbing device permits up-and-down movement of the rotational coupling 13 on the crane mast 1.

The parts described so far form a crane 15. Below the rotational coupling 13 there is a platform 16 on the non-rotatable crane mast 1. On this platform, a concrete distributor device 17 is installed. The concrete distributor device 17 includes a distribution arm of three sections 20, 21 and 22.

Section 20 is connected to section 21 by means of a power actuated coupling 23 which can be actuated by an hydraulic ram 24. For its part, section 21 is connected to section 22 by means of a further power actuated coupling 25, actuated by a ram 26. At the end of the concrete conveyor pipe, only shown in part and indicated at 27', there is a hose 27 from which concrete emerges. This hose is guided, at 28, over the end of an extension piece 28', the extension piece 28' being fastened to the end of the outermost section 22. The distribution arm is used as a carrier structure for the concrete conveyor pipe. The arm has its own rotational mechanism 30, the rotatable part of which consists of a pillar 29. The rotational mechanism 30 has a non-rotatable part 31 which is mounted on the platform 16.

Figure 2:
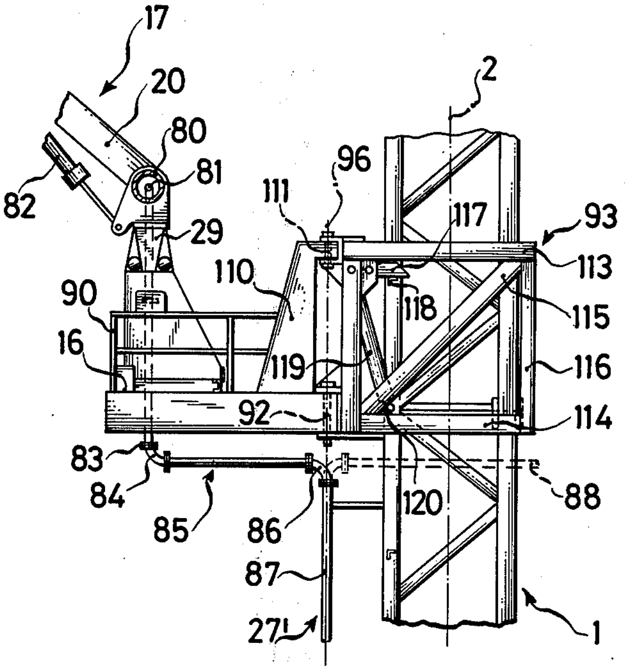
FIG. 2 is a detailed view, on an enlarged scale, of part of the crane of FIG. 1, namely the platform and its associated parts.

In FIG. 2, further details are shown. It can be seen from this figure that the lower section 20 of the distribution arm 17, along with the other sections, is connected to the pillar 29 by a rotational coupling 80 having a horizontal rotational axis 81 and which is actuated by a ram 82. The upper end 87 of the concrete conveyor pipe 27' carries a rotary pipe coupling and a 90° bend 86 connects it to a horizontal section 85, which is connected by way of a further 90° bend 84 and a rotary pipe coupling 83 to a vertical pipe part which is parallel to the part 87 of the pipe, and most of which is shown in chain lines. Because of the rotary pipe couplings, the part 85 of the concrete conveyor pipe connected to the bends 84 and 86 can assume the position shown in dashed lines at 88 in FIG. 2, as well as any intermediate position.

The platform 16 can be walked on and thus has a railing 90. As can be seen from FIG. 3, the platform 16 consists essentially of a box beam 91 of rectangular plan. One of the narrow ends of the platform is connected to the crane mast 1 by means of a rotational coupling, generally indicated at 92, which connects the box beam 91 to a construction 93 surrounding the crane mast 1. The rotational coupling 92 is a power actuated coupling and thus has a drive provided by a ram 94 which acts by way of a linkage system consisting of levers 95 and 95', so that the coupling 92 can be swung through about 270°.

Figure 3:
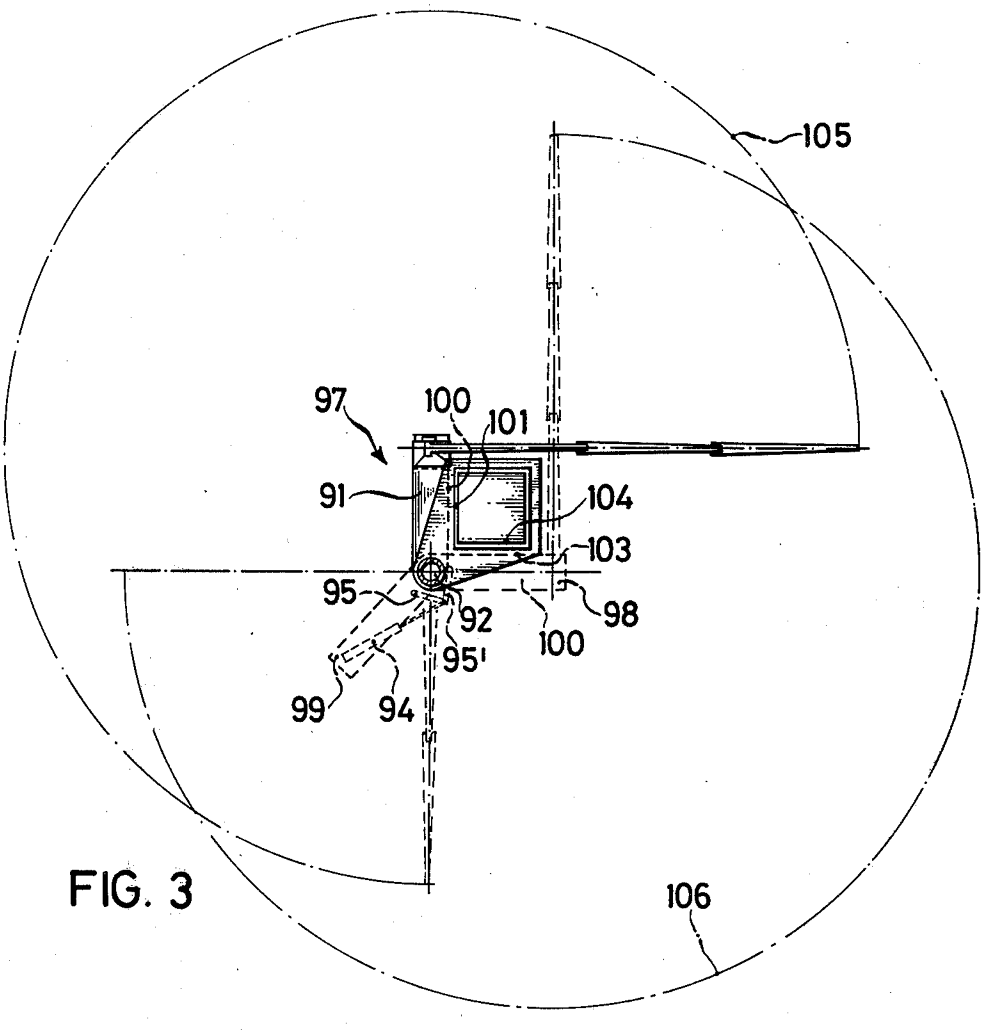
FIG. 3 is a plan showing the operational area of the platform and the distribution arm of the concrete distributor device.

The power actuated coupling 92 has a rotational axis parallel to the axis 2 of the crane mast 1 and thus an operational field which can be seen from FIG. 3. The operational field lies between one limiting position 97 shown in solid lines and another limiting position 98 shown in dashed lines. One of the many intermediate positions is also shown in dashes and indicated at 99. The field of operation is so selected that in the limiting position 97, the longitudinal side 100 of the box beam 91 can be swung against the side 101 of the crane mast, whilst in the other limiting position, the longitudinal side 103 opposite the side 100 can be swung against the side 104 of the crane mast 1, which joins onto the side 101. From FIG. 3 it can further be seen that, in the embodiment shown, the power actuated coupling 92 is located on the extension of the diagonal through the cross-section of the crane mast 1.

Thus, in each limiting position 91 or 98, respectively, of the platform 16, there results a field of swing for the hose 27 shown by the arcs 105 or 106, respectively, in FIG. 3. It can be seen that in the two limiting positions alone the entire operational field lying round the crane column is covered. In addition there are the intermediate positions of the platform 16, which are not shown.

In the embodiment shown, the platform 16 has a support arm 110 which is connected to the construction 93 by a pivotal connection 111. The axis of the coupling 111 coincides with the rotational axis 96 of the coupling 92. Furthermore, the support arm 110 lies above the platform 16 so that is does not interfere with the driven parts of the concrete conveyor pipe 27.

A construction 93, consisting of a framework and individual sections, surrounds the crane mast 1. Essentially the construction 93 consists of an upper frame 113 and a lower frame 114 as well as diagonal struts 115 and frame parts 116. Immediately below the upper frame 113 there is a catch 117 which engages the struts 118 of the crane mast when the construction 93 moves down and thus locks the construction 93 against downwards movement.

The construction 93 can, moreover, climb on the mast 1 under the action of a ram 119 the piston rod of which also braces itself on the lateral struts 120 of the crane mast.

I claim:

1. A rotary tower crane for construction purposes, comprising a non-rotating mast, a boom mounted at the head of the mast by a rotary connection so as to be swingable about the mast axis, a lifting device on the boom consisting of a hoisting rope which can be raised and lowered, and a distributor device for supplying and distributing concrete in the working area of the crane, which distributor device comprises a platform mounted on the mast below said rotary connection, and a distribution arm, serving as a carrier structure for a concrete conveyor pipe, formed in a plurality of sections connected together by power actuated connections and having a rotating mechanism located on the platform, the platform being mounted by a power actuated rotational coupling for swinging movement about an axis parallel to the axis of the crane mast, so as to provide an operational field for the platform which is limited by the extent of swing of the platform on both sides of the crane mast.

2. A rotary tower crane according to claim 1, wherein the platform can be swung through about 270°.

3. A rotary tower crane according to claim 1, wherein the crane mast has a polygonal cross-section and the swing axis of the platform is located on the extension of a diagonal.

4. A rotary tower crane according to claim 1, wherein the platform features a support arm which can be swung around a further rotational coupling the axis of which coincides with the rotational axis of the platform power actuated coupling.

5. A rotary tower crane according to claim 4, wherein the support arm extends above the platform.

6. A rotary tower crane according to claim 1, wherein the rotational coupling is mounted on a construction surrounding the crane mast and fitted with a climbing device.

* * * * *

UNITED STATES PATENT AND TRADEMARK OFFICE

CERTIFICATE OF CORRECTION

PATENT NO. : 4,180,170 Page 1 of 3

DATED : December 25, 1979

INVENTOR(S) : Bernhard Meinken

It is certified that error appears in the above-identified patent and that said Letters Patent are hereby corrected as shown below:

Column 1, line 39 after the word "platform" insert therefore ----comma (,)----. Same line, after the word "swung" insert therefore ----comma (,)----.

Column 1, line 41 after the word "mast" delete the "comma (,)".

Column 1, line 47 after the word "platform" delete the "comma (,)".

Column 1, line 48 delete the word "favourable" and insert therefore ----favorable----.

Column 1, line 51 delete the word "respectively" and insert therefore ----respective----.

Column 1, line 52 after the word "overlap" delete the "comma (,)".

Column 1, line 57 after the word "arm" delete the "comma (,)".

Column 1, line 68 after the "e.g." insert therefore ----comma (,)----.

Column 2, line 12 after the word "means" insert therefore ----comma (,)----.

Column 3, line 15 after the word "on" insert therefore ----comma (,)----.

UNITED STATES PATENT AND TRADEMARK OFFICE

CERTIFICATE OF CORRECTION

PATENT NO. : 4,180,170
DATED : December 25, 1979
INVENTOR(S) : Bernhard Meinken

It is certified that error appears in the above-identified patent and that said Letters Patent are hereby corrected as shown below:

Column 3, line 22 after the word "coupling" insert therefore ----comma (,)----.

Column 3, line 23 after the word "thus" insert ----comma (,)----.

Column 3, line 28 after the word "thus" insert ----comma (,)----. Same line, after "mast 1" insert therefore ----comma (,)----.

Column 3, line 34 after the word "that" insert ----comma (,)----.

Column 3, line 37 delete the word "whilst" and insert therefore ----while----.

Column 3, line 47 after the word "that" insert ----comma (,)----.

Column 3, line 48 after the word "alone" insert ----comma (,)----.

Column 4, line 2 delete the word "is" and insert ----it----.

Column 4, line 6 after the word "essentially" insert ----comma (,)----.

Column 4, line 7 after the numeral "114" insert ----comma (,)----.

UNITED STATES PATENT AND TRADEMARK OFFICE

CERTIFICATE OF CORRECTION

PATENT NO. : 4,180,170

DATED : December 25, 1979

INVENTOR(S) : Bernhard Meinken

It is certified that error appears in the above-identified patent and that said Letters Patent are hereby corrected as shown below:

Column 4, line 10 after the word "down" insert therefore ----comma (,)----.

Column 4, line 11 after the word "thus" insert therefore ----comma (,)----.

Signed and Sealed this

*Seventeenth* Day of *June 1980*

[SEAL]

*Attest:*

SIDNEY A. DIAMOND

*Attesting Officer* *Commissioner of Patents and Trademarks*